(12) United States Patent
Druke

(10) Patent No.: US 9,457,548 B2
(45) Date of Patent: Oct. 4, 2016

(54) MANUAL AND AUTOMATIC FASTENING DEVICE FOR A BONDING ELEMENT AND METHOD THEREFOR

(71) Applicant: Böllhoff Verbindungstechnik GmbH, Bielefeld (DE)

(72) Inventor: Franz Druke, Paderborn (DE)

(73) Assignee: Böllhoff Verbindungstechnik GmbH (DE)

( * ) Notice: Subject to any disclaimer, the term of this patent is extended or adjusted under 35 U.S.C. 154(b) by 0 days.

(21) Appl. No.: 14/546,268

(22) Filed: Nov. 18, 2014

(65) Prior Publication Data

US 2015/0136320 A1 May 21, 2015

Related U.S. Application Data

(62) Division of application No. 12/960,621, filed on Dec. 6, 2010, now Pat. No. 8,919,405.

(30) Foreign Application Priority Data

Dec. 7, 2009 (DE) .................. 10 2009 057 332

(51) Int. Cl.
*B32B 37/12* (2006.01)
*B23P 19/00* (2006.01)
(Continued)

(52) U.S. Cl.
CPC .......... *B32B 37/1284* (2013.01); *B23P 19/006* (2013.01); *B23P 19/007* (2013.01); *B32B 38/0008* (2013.01); *C09J 5/00* (2013.01);
(Continued)

(58) Field of Classification Search
CPC ................ B23P 19/006; B23P 19/007; B29C 65/1606; B29C 66/8322; B29C 66/92; B29C 66/922; B29C 66/9221; B29C 66/92211; B29C 66/929; B29C 66/949; B32B 37/12; B32B 37/1284; B32B 38/00
USPC ......... 156/358, 367, 368, 378, 379.6, 379.8, 156/391, 581, 64; 29/623.4, DIG. 1
See application file for complete search history.

(56) References Cited

U.S. PATENT DOCUMENTS

| 5,193,717 A * | 3/1993 | Rink .................. B21J 15/32 221/124 |
| 5,756,185 A | 5/1998 | Lesser |

(Continued)

FOREIGN PATENT DOCUMENTS

| DE | 2 233 412 | 1/1974 |
| DE | 2233412 | 1/1974 |

(Continued)

OTHER PUBLICATIONS

English Translation of DE 2,233,412 of patent claim 1.
(Continued)

*Primary Examiner* — George Koch
(74) *Attorney, Agent, or Firm* — Barclay Damon, LLP

(57) ABSTRACT

A manual and an automatic fastening device for fastening a bonding element to a surface by means of a light-curing adhesive is disclosed. The fastening devices apply the bonding element to the surface with a specific contact pressure, before the light is irradiated onto the bonding element for curing the adhesive. As the bonding element consists of transparent material, the adhesive is cured between the fastening element and the surface.

23 Claims, 11 Drawing Sheets

Figure 1:
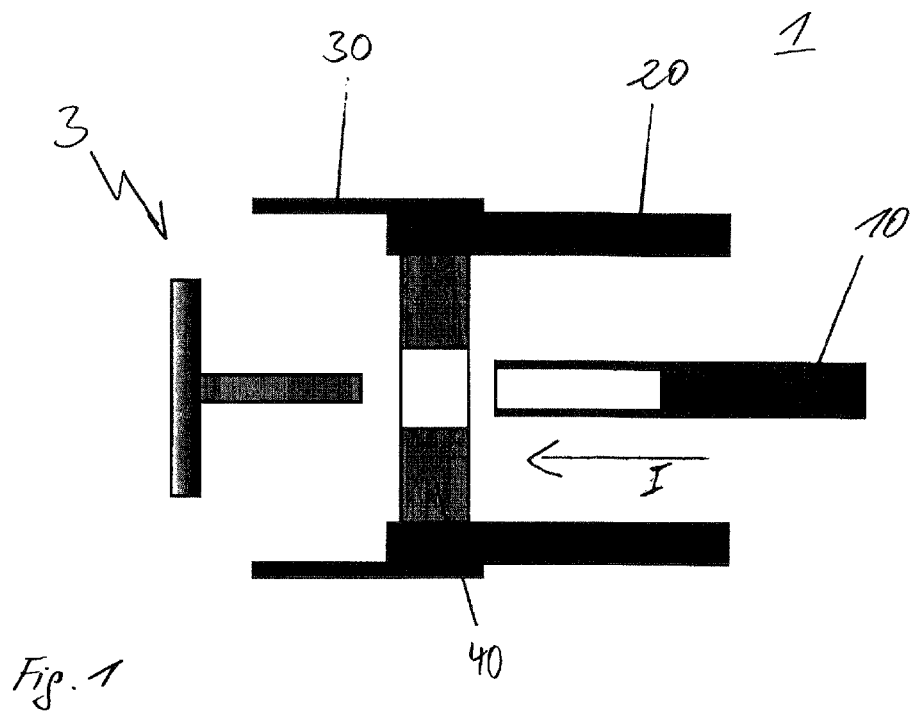

(51) Int. Cl.
*C09J 5/00* (2006.01)
*B32B 38/00* (2006.01)
*B29C 65/14* (2006.01)
*B29C 65/48* (2006.01)
*B29C 65/50* (2006.01)
*B29C 65/78* (2006.01)
*B29C 65/00* (2006.01)

(52) U.S. Cl.
CPC ........ *B29C65/1435* (2013.01); *B29C 65/4835* (2013.01); *B29C 65/4845* (2013.01); *B29C 65/5057* (2013.01); *B29C 65/5092* (2013.01); *B29C 65/7841* (2013.01); *B29C 66/474* (2013.01); *B29C 66/8322* (2013.01); *B29C 66/949* (2013.01); *B32B 2037/1253* (2013.01); *C09J 2205/31* (2013.01)

(56) References Cited

U.S. PATENT DOCUMENTS

| | | | |
|---|---|---|---|
| 7,371,303 | B2 | 5/2008 | Schmitt |
| 7,815,988 | B2 | 10/2010 | Stumpf et al. |
| 2001/0054479 | A1* | 12/2001 | Takemoto et al. ......... 156/275.5 |
| 2002/0134489 | A1* | 9/2002 | Sweeney, Jr. ............ B60J 1/005 156/108 |
| 2003/0010441 | A1* | 1/2003 | Bremont ............... B23P 19/006 156/309.9 |
| 2008/0251196 | A1 | 10/2008 | Stumpf et al. |
| 2009/0000112 | A1* | 1/2009 | Ikushima ........................ 29/791 |

FOREIGN PATENT DOCUMENTS

| | | |
|---|---|---|
| DE | 44 02 550 A1 | 8/1995 |
| DE | 196 38 521 C2 | 7/1998 |
| DE | 196 38 521 C2 | 4/2001 |
| DE | 10 2004 012 786 A1 | 9/2005 |
| DE | 10 2006 012 411 | 4/2007 |
| DE | 10 2007 016 851 | 10/2008 |
| EP | 1 329 580 B1 | 12/2002 |
| EP | 1 329 580 B1 | 7/2009 |

OTHER PUBLICATIONS

English Translation of DE 2,233,412.
English Translation of EP 1329580.
Office Action with scheduled of cited references dated Aug. 26, 2010; 8 pages.
Translation of DE 196 38 521 C2, published in German on Jul. 30, 1998.

* cited by examiner

MANUAL AND AUTOMATIC FASTENING DEVICE FOR A BONDING ELEMENT AND METHOD THEREFOR

CROSS-REFERENCE TO RELATED APPLICATION

This application is a divisional application, pursuant to 35 USC §120, of U.S. application Ser. No. 12/960,621, filed Dec. 6, 2010, now U.S. Pat. No. 8,919,405 which claims priority of DE 102009057332.1-24, filed Dec. 7, 2009, the entire contents of each application being incorporated by reference herein.

FIELD OF THE INVENTION

The present invention relates to a manual and an automatic fastening device for a bonding element, in particular a T-shaped mounting element, as well as a manual and an automatic fastening method for such a bonding element.

BACKGROUND OF THE INVENTION

Adhesive fastening elements which serve for holding structural and functional parts are increasingly used in industry. Such fastening elements consist, for example, of a T-shaped structure, if said fastening elements are viewed in cross section. Said T-shaped structure comprises a plate-shaped fastening surface to which a bolt-like element of a different design is fastened. Said bolt-like element has, for example, a thread, a snap connection or any other structures. The plate-like element provides a fastening surface to which adhesive is applied. Said fastening surface is then applied to a surface to be held and fastened by curing the adhesive.

DE 196 38 521 C2 discloses, for example, the automatic fastening of such bonding elements by means of a thermosetting adhesive. To this end, the fastening element already comprises the thermosetting adhesive. Said adhesive does not hinder the supply of the fastening elements, as at room temperature it is dry and not adhesive. Thus there is the possibility of supplying the fastening elements via a supply tube to a set head. Said set head grips the individual fastening elements and mounts said fastening elements on the desired surface. Subsequently, by means of a magnetic field, heat is produced which softens and cures the thermosetting adhesive on the fastening element. Such adhesive properties are also disclosed in DE 44 02 550 A1.

DE 10 2004 012 786 A1 also discloses an automatic fastening device for such bonding elements. The bonding elements provided with adhesive are removed from a temporary store and automatically transferred to the set head. The set head then moves with the bonding element towards the desired surface for fastening. Here again, by means of a magnetic field and heat, the adhesive located on the bonding element is cured.

Proceeding from the above-disclosed fastening devices, it is the object of the present invention to provide an alternative fastening device and a corresponding fastening method for bonding elements.

SUMMARY OF THE INVENTION

The aforementioned object is achieved by a manual fastening device for a bonding element, in particular a T-shaped mounting element, by a manual fastening method for the bonding element, by an automatic fastening device for the bonding element as well as by an automatic fastening method for the bonding element according to the herein appended claims. Advantageous embodiments of the present invention and developments are revealed from the following description, the accompanying drawings and the accompanying claims.

The manual fastening device according to the present invention comprises the following features: a holder arranged in a housing which is movable in a linear manner in a first direction of movement, to which the bonding element may be releasably fastened, a light source by which light of a defined wavelength may be radiated in the first direction of movement, and a positioning device arranged movably relative to the housing, by which the fastening device may be positioned correctly relative to a surface, in order to apply the bonding element.

The present invention discloses a manual device for fastening the bonding element to a surface, for example a structural element of a motor vehicle. To this end, the bonding element consists of a plate-like component which is mounted on the surface. On this plate-like component, a light-curing adhesive is applied which may be cured by means of light of a specific wavelength. A bolt-like component is fastened to this plate-like component. The bolt-like component has, for example, a fastening structure such as a thread, a snap connection or the like. By means of the bolt-like component, the bonding element is fastened to the holder of the fastening device. Said holder is movable in a first direction of movement so that the bonding element may be mounted in a targeted manner on a surface. In order to position the bonding element correctly by means of the fastening device, a positioning device is used. This ensures that the plate-like bonding surface of the bonding element is arranged parallel to the surface of the structural component, in order to ensure subsequent optimal fastening of the bonding element. As soon as an optimal arrangement of the fastening device and thus of the bonding element is achieved relative to the surface by means of the positioning device, the holder moves the bonding element onto the surface. The light source is activated by the movement of the holder or by a separate connection to the system or by the optimal position being already reached by means of the positioning device. Said light source causes the adhesive on the bonding element to cure, so that a reliable connection is produced between the surface and the bonding element. This reliable connection between the bonding element and the surface is sufficient to detach the holder and thus the entire fastening device from the bonding element.

In a preferred embodiment of the present invention, the positioning device provides radial light protection relative to the light source of the manual fastening device, in order to avoid lateral radiation of the light source. Moreover, it is preferred if the positioning device is able to be moved into an installation position in which the bonding element may be installed in the holder, and is able to be moved into a preparation position in which the positioning device is prepared for mounting onto the surface.

The positioning device is, for example, arranged coaxially relative to the housing of the fastening device and is movable. For the installation of a bonding element in the holder, the positioning device is displaced into the installation position. This releases the holder, so that the bonding element may be fastened there. Subsequently, the positioning device is displaced into the preparation position, in which it covers and/or radially surrounds the holder and the bonding element fastened thereto. This installation position is used so that the positioning device is initially mounted on this surface during the movement of the manual fastening device in the direction of the surface of the structural component. By the suitable alignment of the fastening device relative to the surface, the positioning device is correspondingly displaced, so that as a result of this displacement a suitable positioning of the fastening device relative to the surface may result. In this case, the positioning device has been moved into a mounting position between the installation position and preparation position. The reaching of this mounting position, i.e. the position for mounting the bonding element onto the surface, is signalled by means of an information means. This information means is preferably a light source or an audio signal transmitter.

With regard to the positioning device, it is further preferred that said positioning device has a plurality of sensors on a front face facing the surface. Said sensors detect when a desired positioning of the fastening device has been reached relative to the surface. According to one embodiment, three sensors are distributed equally on the front face of the positioning device. Only when the positioning device and thus the entire manual fastening device is arranged perpendicular to the surface of the structural component, do all sensors emit a corresponding signal and permit in this manner a desired or optimal positioning of the manual fastening device to be detected. The reaching of the desired positioning is signalled to the user of the manual fastening device by means of a light signal or audio signal. On this basis, the user attempts to maintain the positioning and further steps for fastening the bonding element in the holder follow. Thus, for example, at the same time as the signal for optimal positioning, the holder, which is preferably pretensioned by a spring, could be automatically released for mounting the bonding element onto the surface and then the light source activated for curing the adhesive. As soon as the required time for curing the adhesive has passed, the light source for curing is automatically switched off, and thus additionally signals that the fastening device is allowed to be removed from the bonding element.

The present invention also discloses a manual fastening method for the bonding element, in particular by means of the above-described manual fastening device. This manual fastening method comprises the following steps: releasably receiving the bonding element in a holder of a fastening device, positioning the bonding element over a surface, by a positioning device of the fastening device being brought into a mounting position based on interaction with the surface, mounting the bonding element on the surface and securing the bonding element to the surface as a result of light radiation. With regard to the manual fastening method, it is preferred to apply the adhesive, in particular light-curing adhesive, onto the bonding element before or after receiving the bonding element in the holder.

The present invention also discloses an automatic fastening device for the bonding element already disclosed above. This automatic fastening device has the following features: a holder to which the bonding element may be releasably fastened, and at least one magazine in which a plurality of bonding elements are removably stored. Additionally, the automatic fastening device according to the invention comprises a light source, by which the bonding element fastened in the holder may be irradiated in a targeted manner. The holder and the at least one magazine are arranged so that a linear and/or a pivoting movement may be carried out by the holder and/or a linear and/or a pivoting movement may be carried out by the magazine, so that the holder may be loaded automatically with individual bonding elements. The automatic fastening device carries out the application of a plurality of bonding elements in an automated production line. To this end, the bonding elements required for a complete production cycle are stored in the at least one magazine. Either the magazine or the holder or both are able to be moved in a targeted manner in order to load the automatic fastening device with a bonding element. Based on matching the movements of the magazine and the holder to one another, the interfering contour of the automatic fastening device is varied in a targeted manner. This has the result that in a loading position of the holder and magazine for loading a bonding element into the holder, the fastening device has a larger interfering contour than in a mounting position for mounting the bonding element onto the surface. In this manner it is ensured that, due to the smaller interfering contour of the fastening device when mounting the bonding elements, the desired positions may be achieved more easily, for example in the construction of automobiles.

According to a preferred embodiment, the at least one magazine of the fastening device is arranged parallel to a mounting direction of the fastening device for the bonding elements. A pivoting movement may be carried out by the holder for the bonding element, which moves the holder from a position parallel to the mounting direction into a loading position adjacent to the magazine and back. In this loading position, in each case a bonding element may be removed from the adjacent magazine by means of the holder. To this end, preferably a plurality of bonding elements are stored in the magazine. These bonding elements are spring-pretensioned in the direction of a holding position of the magazine, so that after removal of the bonding element from the holding position of the magazine, a new bonding element is automatically moved into the holding position. The spring pretensioning also preferably ensures that no external power has to be supplied to the magazine, in order to move the bonding elements.

It is additionally preferred to arrange the magazine to be movable in a linear manner perpendicular to the mounting direction. By means of this linear movement, the magazine may be moved between the loading position and a resting position. Thus, the resting position of the magazine used when mounting the bonding element also ensures that the fastening device has a smaller interfering contour than when the magazine is in the loading position.

Additionally, the fastening device preferably comprises a dispenser by which the bonding element may be provided with light-curing adhesive. The dispenser is preferably arranged so that it applies the adhesive before the bonding element is received in the at least one magazine or before the bonding element is mounted by the holder onto the surface. Additionally, the dispenser is preferably provided with a temporary store for bonding elements. Initially, individual bonding elements are supplied to the dispenser in order to provide said bonding elements in each case with adhesive. Subsequently, the bonding elements provided with adhesive are displaced into the temporary store. As soon as the temporary store has a plurality of bonding elements, preferably the number of bonding elements able to be stored in a magazine, this plurality of bonding elements are displaced together into a magazine. To this end, the magazine is able to be connected to the temporary store, so that by this displacement of the plurality of bonding elements said bonding elements are placed under spring-pretensioning in the magazine.

It is, moreover, preferred to use the above-described automatic fastening device in combination with a robot.

The present invention additionally discloses an automatic fastening method for the bonding element, in particular a T-shaped mounting element. This automatic fastening method comprises the following steps: releasably receiving the bonding element from a magazine in a holder of a fastening device based on a linear and/or pivoting movement of the holder and/or a linear and/or pivoting movement of the magazine. The mounting of the bonding element onto a surface and the irradiation of the bonding element with light, so that an adhesive located on the bonding element fastens the bonding element to the surface, follow as further steps.

A further automatic fastening device of a bonding element according to the invention, in particular a T-shaped mounting element, comprises a holder, to which the bonding element may be releasably fastened, and at least one bonding element-supply channel via which a plurality of bonding elements may be individually supplied to the holder, an adhesive dispenser, with which adhesive, in particular light-curing adhesive, may be applied automatically to the bonding element or at a fastening point onto a surface for fastening the bonding element, and a light source with which the bonding element fastened in the holder and/or the fastening point may be irradiated in a targeted manner. According to a preferred embodiment the automatic fastening device is fastened to a robot. Preferably, the holder is arranged pivotably and/or movably in a linear manner parallel to a mounting direction of the bonding element. For applying the adhesive, the adhesive dispenser may be moved in a linear manner and/or arranged in a pivotable manner, in order to be movable towards the bonding point and/or towards the bonding element in the holder.

The present invention additionally comprises a further automatic fastening method for the bonding element, in particular of a T-shaped mounting element. The fastening method comprises the following steps: automatically supplying individual bonding elements via a supply channel to a holder of a fastening device, releasably receiving the bonding element in the holder, applying a light-curing adhesive to the bonding element and/or to a surface based on a linear and/or pivoting movement of the holder and/or a linear and/or pivoting movement of an adhesive dispenser, mounting the bonding element onto the surface and irradiating the bonding element with light, so that an adhesive located on the bonding element and/or the surface fastens the bonding element to the surface.

BRIEF DESCRIPTION OF THE ACCOMPANYING DRAWINGS

Figure 2:
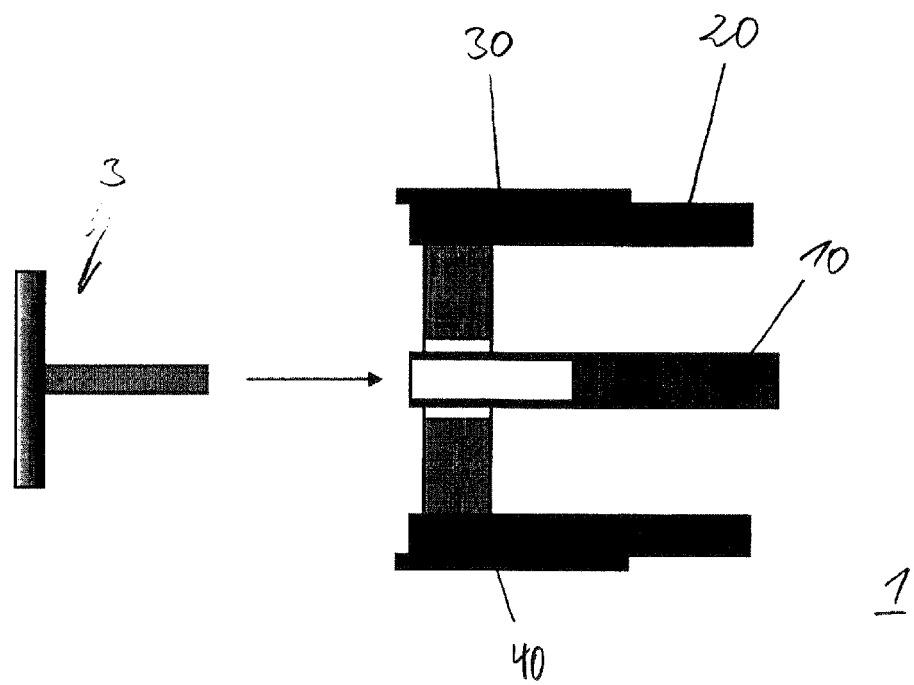
Figure 3:
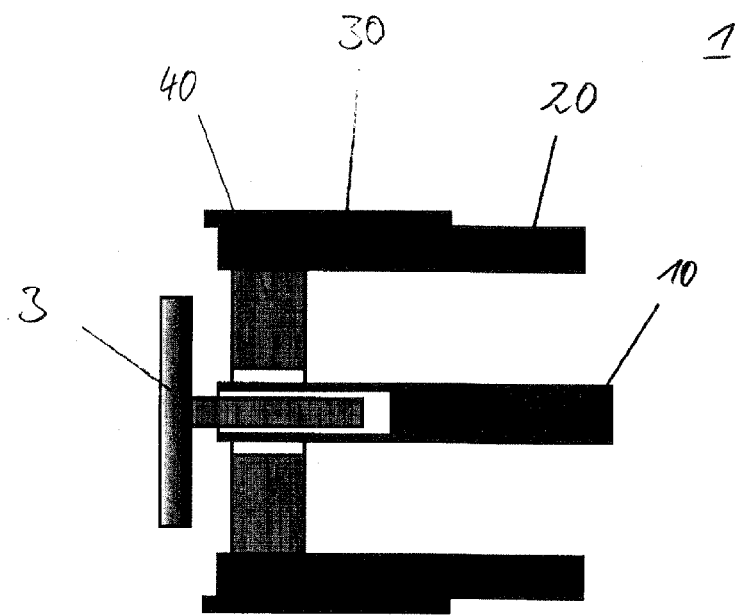
Figure 4:
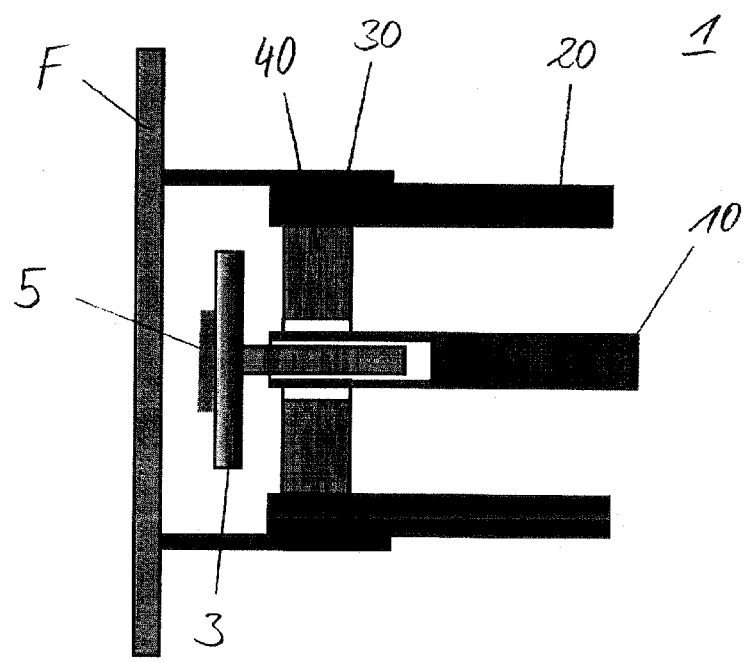
Figure 5:
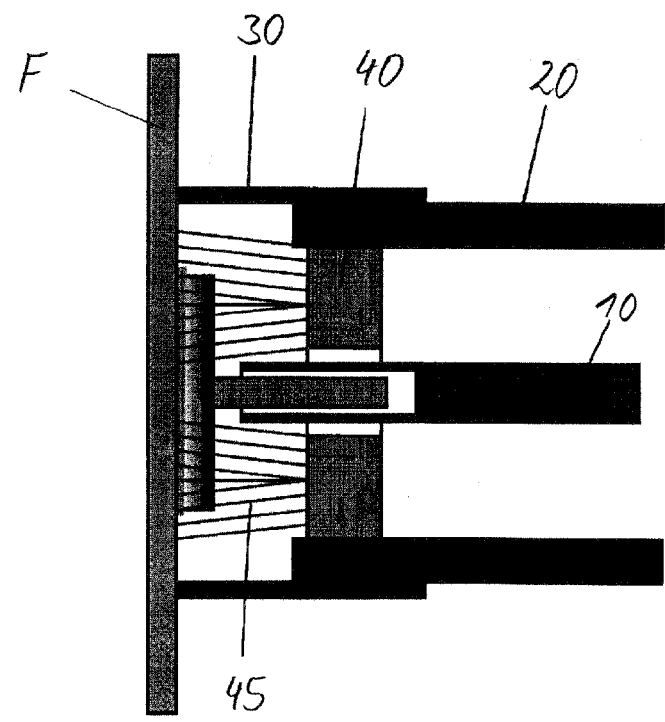
Figure 6:
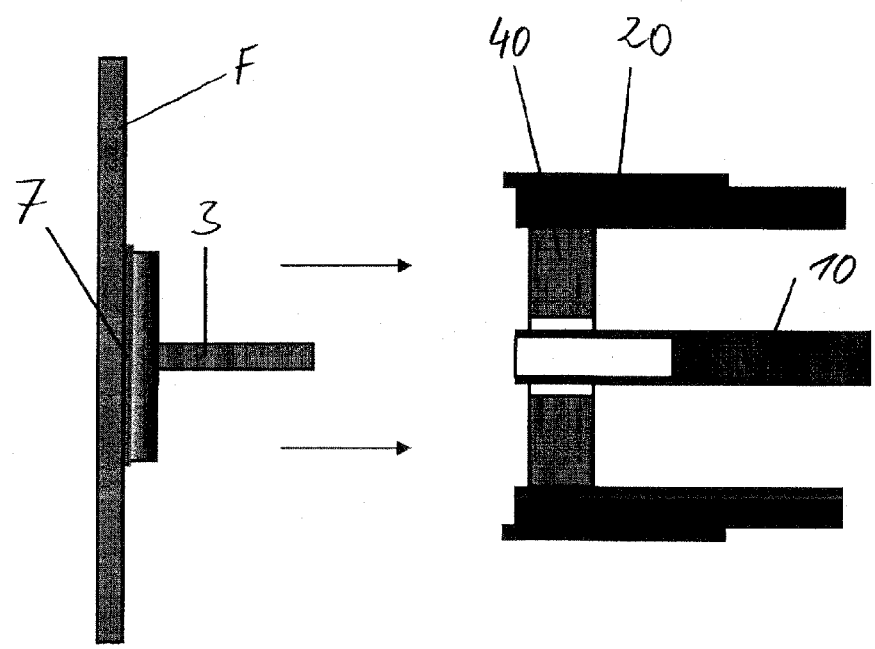
Figure 7:
Figure 8:
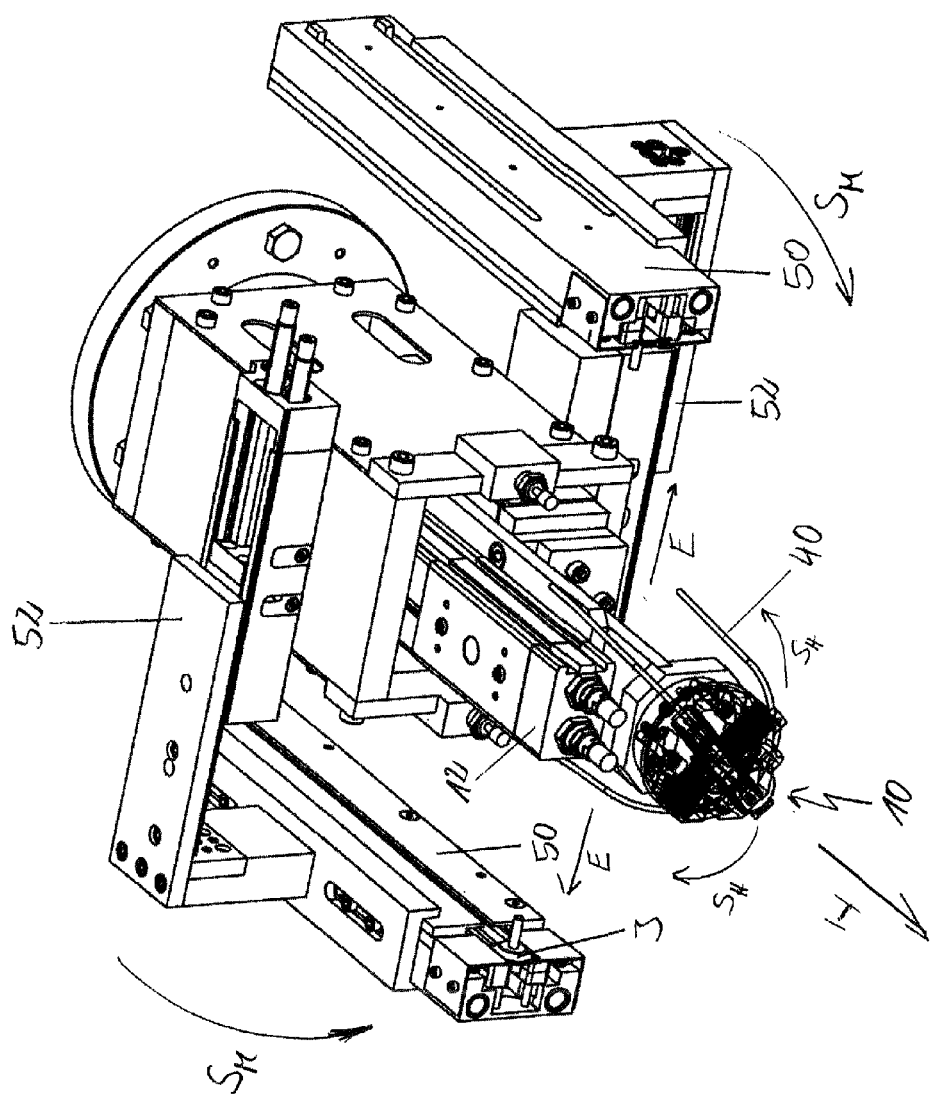
Figure 9:
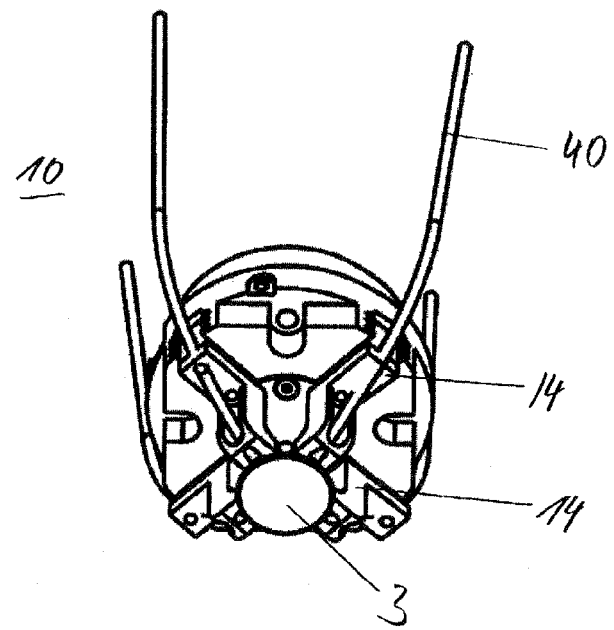
Figure 10:
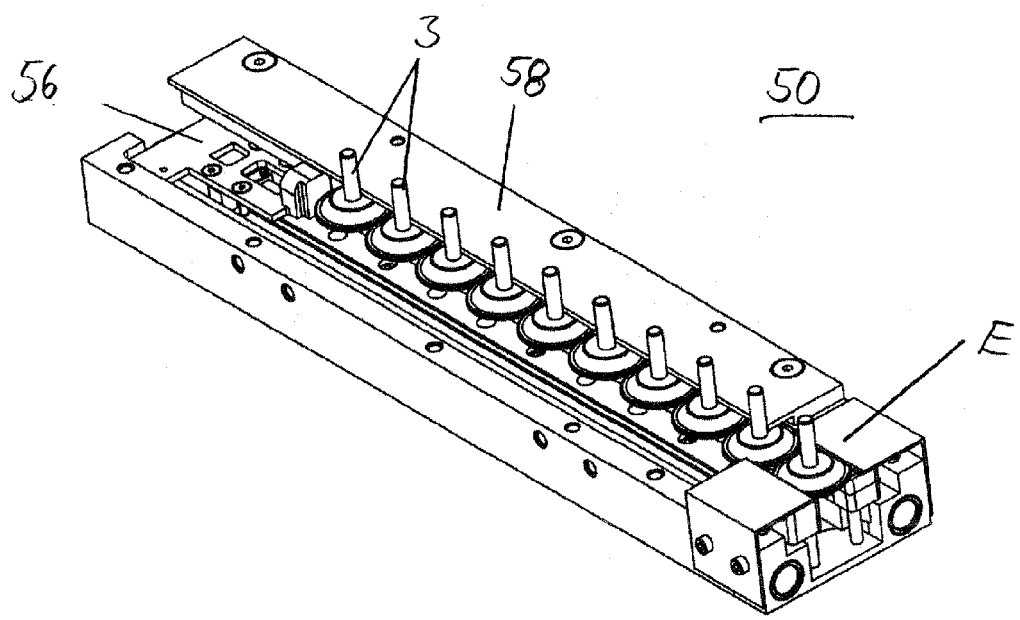
Figure 11:
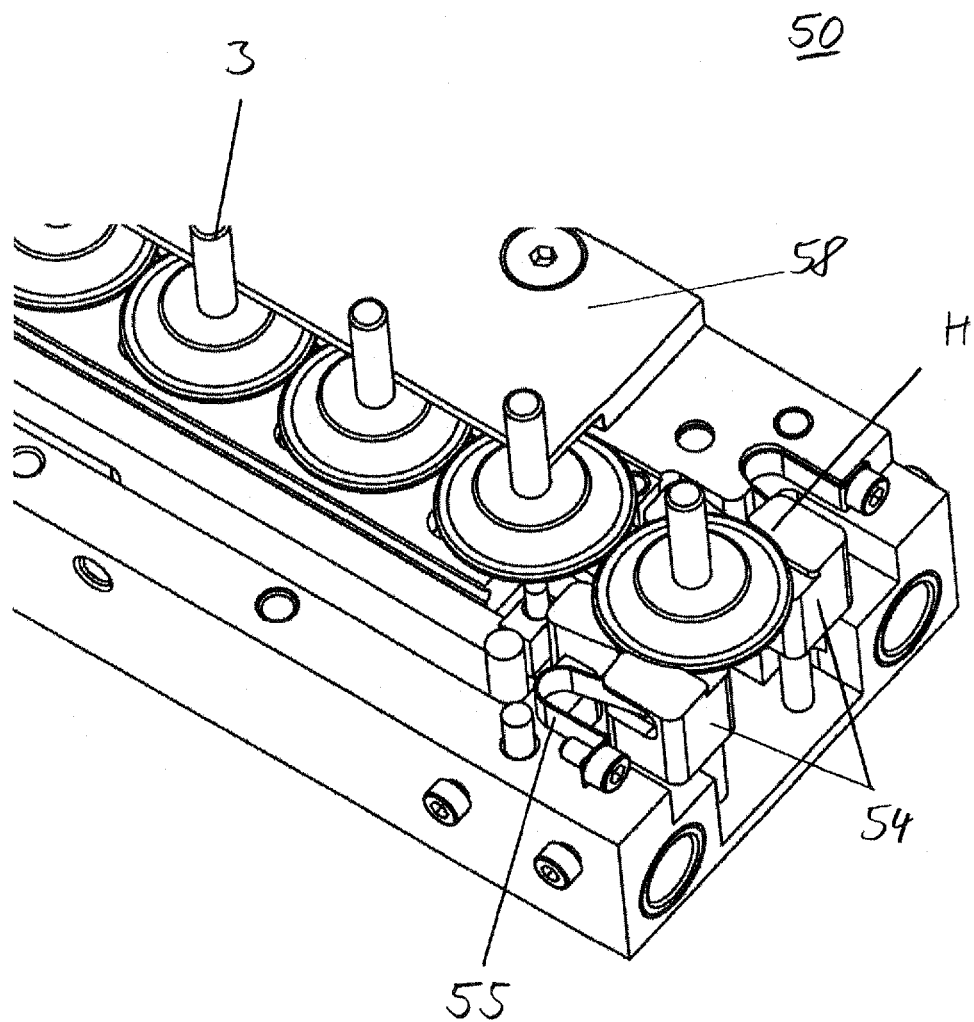
Figure 12:
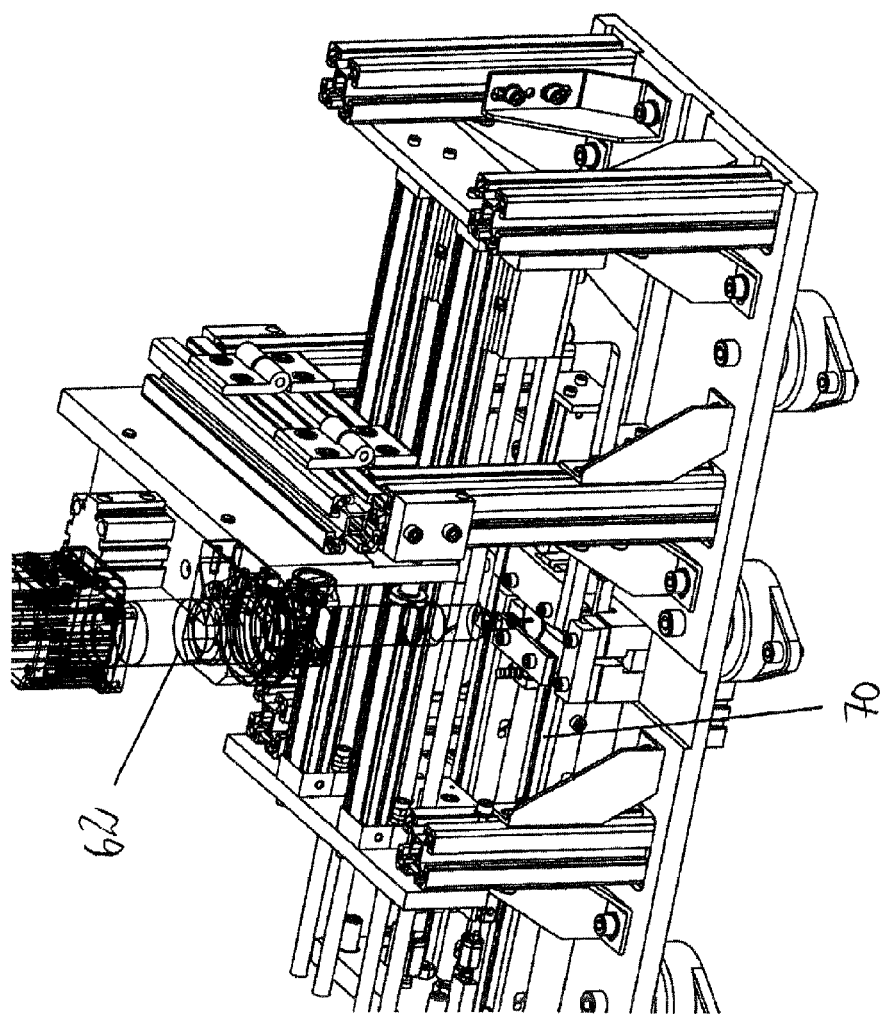
Figure 13:
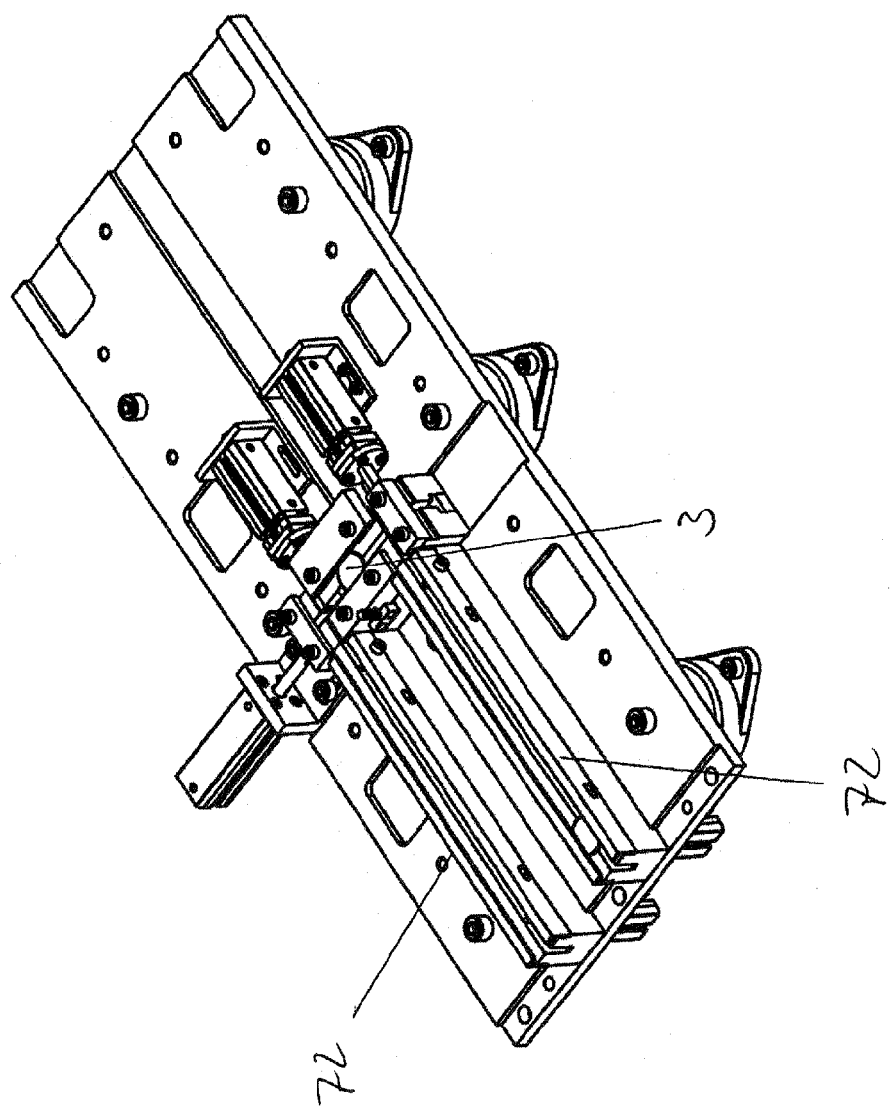
Figure 14:
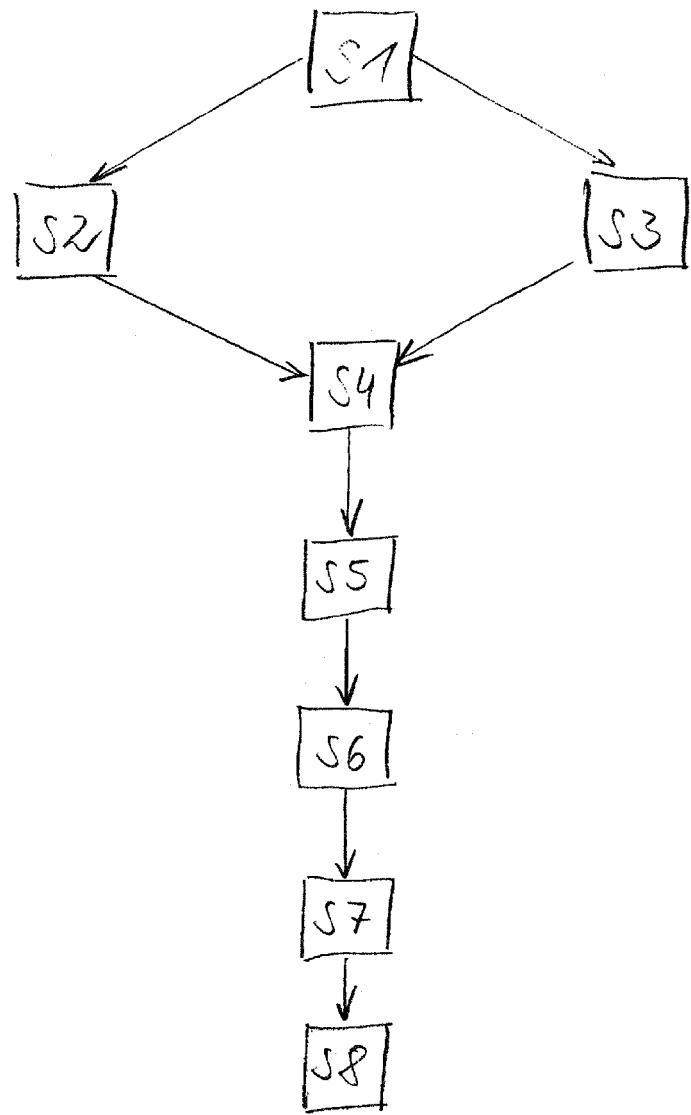
Figure 15:
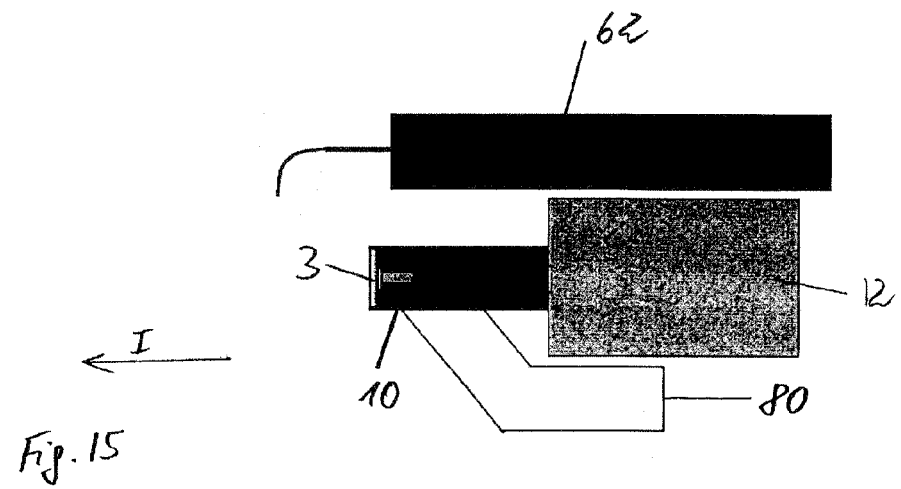
Figure 16:
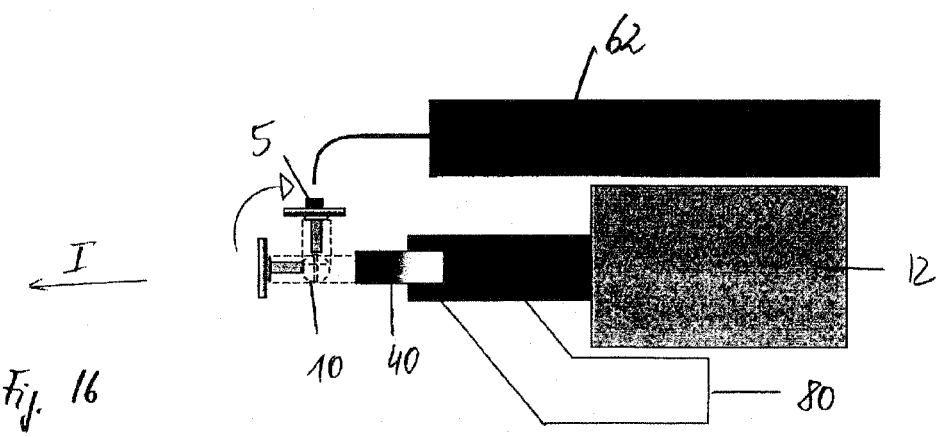
Figure 17:
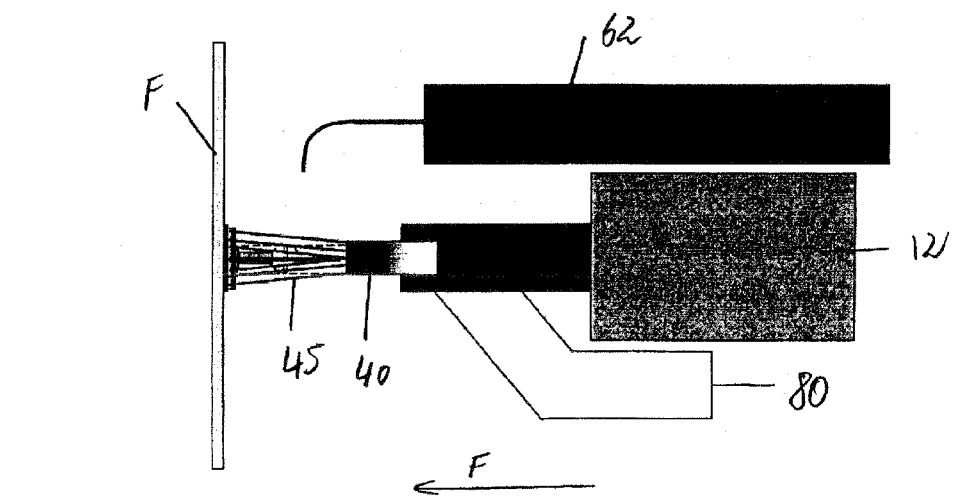

The preferred embodiments of the present invention are described in more detail with reference to the accompanying drawings, in which:

FIG. 1 shows a schematic sectional view of a preferred embodiment of the manual fastening device, FIG. 2 shows the manual fastening device of FIG. 1 with the positioning device in the installation position, FIG. 3 shows the manual fastening device of FIG. 1 with the bonding element installed in the holder, FIG. 4 shows the manual fastening device of FIG. 1 with the positioning device in the preparation position, FIG. 5 shows the manual fastening device of FIG. 1 when fastening the bonding element by means of light radiation, FIG. 6 shows the manual fastening device of FIG. 1 after removal of the bonding element from the holder, FIG. 7 shows a schematic flow diagram of a preferred embodiment of the manual fastening method, FIG. 8 shows a perspective view of a preferred embodiment of the automatic fastening device, FIG. 9 shows a partial view of a preferred embodiment of the holder of the automatic fastening device, FIG. 10 shows a perspective partial view of a preferred embodiment of a magazine, FIG. 11 shows an enlarged partial view of the magazine of the automatic fastening device of FIG. 10, FIG. 12 shows a perspective schematic view of a preferred embodiment of the dispenser of the automatic fastening device, FIG. 13 shows a partial view of a preferred embodiment of the temporary store of the dispenser of FIG. 12, FIG. 14 shows a flow diagram of a preferred embodiment of the automatic fastening method, FIGS. 15-17 show different operating situations of a further preferred embodiment of an automatic fastening device.

DETAILED DESCRIPTION OF PREFERRED EMBODIMENTS

The manual and automatic fastening device 1, 9 according to the invention is used for fastening very different bonding elements 3 by means of light-curing adhesive 5. The bonding element 3 consists of a plate-like and a bolt-like portion, so that it forms in side view a T-shaped mounting element. The complete bonding element 3 or at least the plate-like portion consists of a transparent material, preferably plastics material. Due to this design, the bonding element 3 may be irradiated by means of light, in order to cure a light-curing adhesive which has been applied to the plate-like portion or a surface F of a component.

The plate-like portion provides a smooth surface or a recess on/in which the adhesive is applied and/or incorporated. Additionally, projections or an annular edge are provided in order to avoid inadvertent penetration of the adhesive when pressing the bonding element onto the surface of the bonding point.

The bolt-like portion of the bonding element 3 is configured as a fastening portion or generally as a functional portion. To this end, the bolt-like portion, for example, has a thread, a snap connection or a latching connection.

FIG. 1 shows a schematic view of a preferred embodiment of the manual fastening device 1. The manual fastening device 1 represents a manual device with which individual bonding elements 3 are fastened to the surface F. The surface F is, for example, formed by structural components in automobile manufacture. Also, other fields of application are conceivable in which bonding elements 3 of any type may be reliably fastened by light-curing adhesive.

The manual fastening device 1 comprises a housing 20. A movable holder 10 for the bonding element 3 is arranged in the housing 20. The holder 10 is movable in a linear manner in a mounting direction I perpendicular to the surface F (see FIG. 4). Preferably, the holder 10 is moved by a spring force in order to produce a reproducible contact force of the holder 10 with the bonding element 3. Also a motorised or manual drive of the holder 10 is preferred.

The holder 10 comprises a fastening arrangement 12 to which the bonding element 3 may be fastened. This fastening arrangement 12 produces a non-positive or positive connection to the bonding element 3. Such connections, for example, include a clamped or latching connection as well as a screw connection between the bonding element 3 and the holder 10.

The manual fastening device 1 additionally comprises a light source 40. The light source 40 radiates light 45 in the mounting direction I, in order to radiate through the bonding element 3 and to cure the adhesive. Preferably, the light source 4 surrounds the holder 10 in an annular manner. It is also preferred to arrange individual light sources 40 on the side of the housing 20 facing the bonding element 3. Preferably, the light source 40 emits light of a defined wavelength, in particular blue light. The defined wavelength of the light 45 ensures that the adhesive 5 between the surface F and the bonding element 3 cures and produces a connection as rapidly as possible.

The housing 20 comprises, moreover, a positioning device 30. Said positioning device 30 is preferably arranged displaceably relative to the housing 20. It serves for monitoring the position of the manual fastening device 1 relative to the surface F. To this end, the positioning device 30 detects whether the manual fastening device 1 is positioned perpendicular to the surface F in order to fasten the bonding element 3. A parallel alignment between the plate-like region of the bonding element 3 and the surface F only results with such a positioning. This alignment and a contact force of the bonding element 3 to be applied in a reproducible manner onto the surface F ensure that a reliable bonded connection between the bonding element 3 and the surface F is produced.

For fastening the bonding element 3 (Step B) in the holder 10 the positioning device 30 is preferably moved into an installation position according to FIG. 3 (Step A). The positioning device releases the holder 10 in order to be able to install and/or fasten the bonding element 3 unhindered in the holder 10. The bonding element 3 is preferably held by the holder 10 by a force fit or threaded connection. For illustration, the installed bonding element 3 in the holder 10 is shown in FIG. 3.

Subsequently, the positioning device 30 is preferably moved into a preparation position (Step C). The preparation position is used to protrude over the bonding element 3 fastened in the holder 10. As a result, a suitable positioning of the manual fastening device 1 is provided. This state is shown schematically in FIG. 4.

According to FIG. 4, the bonding element 3 after being releasably received in the holder 10 (Step A) has been provided with the light-curing adhesive 5. It is also preferred to apply the light-curing adhesive onto the bonding element 3 before the bonding element is received in the holder. In FIG. 4 it may also be seen that the positioning device 30 has been moved from the installation position according to FIG. 3 into the preparation position (Step C). The preparation position of the positioning device 30 is used for preparing the mounting of the manual fastening device onto the surface F.

In order to fasten the bonding element 3 reliably to the surface F, the surface F and the plate-like portion of the bonding element 3 would have to be arranged parallel to one another. This correct alignment of the manual fastening device 1 and thus of the bonding element 3 to the surface F is achieved by means of the positioning device 30. To this end, the positioning device 30 is mounted on the surface F. Due to the manual pressure on the manual fastening device 1, the positioning device 30 is displaced counter to the mounting direction I. If this displacement of the positioning device 30 takes place uniformly relative to the outer peripheral surface of the housing 20 and/or in vertical alignment of the manual fastening device 1 with the surface F, the positioning device 30 reaches a mounting position according to FIG. 5. The reaching of the mounting position is preferably able to be detected by means of buttons, electrical switches or electrical contacts (Step E), which are arranged on the outside of the housing 20. Only when the manual fastening device 1 is oriented correctly does the positioning device 30, when reaching the mounting position, activate the switches or sensors distributed equally over the external periphery on the housing 20. This state is then signalled by means of a suitable information source (Step F). According to an alternative, an indicator light is switched on or an audio signal is emitted. It is also preferred if the light source 40 is connected to the system as a suitable signal.

According to a further embodiment, the positioning device 30 comprises a plurality of buttons, switches or sensors on the front face facing the surface F. Preferably, at least three buttons, switches or sensors are arranged on this front face of the positioning device 30. If the front face of the positioning device 30 is pressed onto the surface F of a component, and correctly abuts the front face, the manual fastening device 1 is aligned perpendicular to the surface F. In this case, all buttons or sensors of the front face of the positioning device 30 provide a corresponding signal, which for example may be visualised by means of an LED on the manual fastening device. The positioning device is thus also located in the mounting position. Then the holder 10 is released in order to press the bonding element 3 against the surface F. If the holder 10 is spring-pretensioned in the mounting direction I, after releasing the bonding element 3 it presses with a defined contact pressure against the surface F. On this structural basis, the mounting and securing of the bonding element 3 onto the surface F with a uniform position of the fastening device 1 is ensured in each case under the same conditions.

The buttons or sensors on the front face of the positioning device 30 may additionally display a loss of contact force of the bonding element 3 on the surface F. If, for example, when the bonding element 3 is exposed to light (see below), the user of the manual fastening device 1 removes the contact pressure from the manual fastening device 1, the buttons may detect this state and emit a corresponding warning message.

FIG. 5 shows the state in which the manual fastening device 1 is arranged correctly relative to the surface F and at the desired spacing. If this is the case, this is preferably signalled by means of a light signal or audio signal (Step G). It is also conceivable that the light source 40 is connected to the system (Step G) as the signal. The user of the fastening device 1 perceives the light signal and/or audio signal from Step G. Although the positioning device 30 preferably also acts as lateral light protection, and prevents a radial emergence of light 45, the user of the manual fastening device 1 also perceives the light 45 as a signal, if this should be desired.

The light signal and/or audio signal is crucial in order to mount the bonding element 30 by moving the holder 10 in the mounting direction I onto the surface F (Step H). Preferably, to this end, the spring-pretensioned holder 10 is released so that it presses the bonding element 3 against the surface F with a defined spring force. In this connection, it is also preferred to move the holder 10 manually in the direction of the surface F or to release said holder automatically due to the signal of the positioning device 30. The light 45 is radiated in the mounting direction I from the light source 40. It radiates through the transparent bonding element 3 and, as a result, produces a bonded connection 7 between the surface F and the bonding element 3 (Step I). For producing the bonded connection, the light 45 radiates over a time period of 0.5 to 10 seconds, preferably 0.5 to 5 seconds onto the bonding element 3. As the bonding element 3 consists of transparent material, it acts in a similar manner to a fibre-optic conductor. This has the result that the incident light 45 is also forwarded into regions in which it does not directly radiate. In this manner, it is ensured that the light-curing adhesive cures the entire area of the bonding element 3.

After the adhesive has cured and the bonding element 3 is secured to the surface F (Step I), the holder 10 is released from the bonding element 3. Additionally, the positioning device 20 is moved back into the installation position in order to facilitate the insertion of a new bonding element. The different method steps disclosed above are again combined schematically in the flow diagram of FIG. 7.

The light source 40 of the manual fastening device 1 is supplied with power by means of a battery. In order to ensure a reproducible curing of the adhesive via light radiation, the prescribed electrical voltage always has to be applied to the light source 40. Thus it is necessary to check whether, before exposing the bonding point to light, the battery has sufficient voltage in order to ensure at least one further exposure cycle at the required voltage. Thus it is preferred that the battery of the manual fastening device 1 is continuously monitored. According to a preferred embodiment, the result of this monitoring is additionally stored at regular intervals.

It has already been described above that the adhesive 5 is applied to the bonding element 3. Should the bonding element 3 have a central through-opening, optionally the adhesive may be applied through the bonding element 3. Then the bonding element 3 would only be pressed onto the surface F and a low viscous adhesive sprayed through the holder 10 into the bonding joint between the surface F and the bonding element 3. Subsequently, the light 45 of the light source 40 is radiated, in order to achieve the bonded connection between the surface F and the bonding element 3.

The present invention additionally comprises an automatic fastening device 9. A preferred embodiment of the automatic fastening device 9 is shown in FIG. 8. In contrast to the manual fastening device 1, the automatic fastening device 9 is provided with at least one magazine 50 for a plurality of bonding elements 3. The number of bonding elements 3 is sufficient in order to carry out an entire cycle fully automatically within an assembly line. To this end, the automatic fastening device 9 is preferably fastened to a robot which moves towards the individual fastening points of the bonding elements 3 in a targeted manner.

The automatic fastening device 9 also comprises a holder 10 for a bonding element 3. The holder 10 is shown in greater detail in FIG. 9. The holder 10 is preferably formed by a grip mechanism with a plurality of arms 14. The arms 14 are arranged in the shape of a star, preferably four arms 14 in order to remove a bonding element 3 from the magazine 50 in a targeted manner (Step S6). To this end, the arms 14 grip the bolt-like portion of the bonding element 3 at a holding position H of the magazine 50. The grip mechanism preferably also consists of only two arms 14 or a further suitable structure, in order to remove the bonding element 3.

Fibre-optic cables 40 terminate adjacent to the grip mechanism. They serve as a light source in order to cure the adhesive by exposure to light according to Step S8. Instead of the fibre-optic conductors 40, it is also preferred to arrange an annular light source or a plurality of LEDs adjacent to the grip mechanism.

According to a preferred embodiment, the holder 10 is movable in a linear manner in its longitudinal direction parallel to the mounting direction I. In addition, the holder 10 is able to be pivoted out of its mounting position shown in FIG. 8 into a removable position E (see arrows $S_H$ in FIG. 8). In the removable position E the holder 10 is preferably arranged perpendicular to the mounting direction I.

At least one magazine 50 is arranged parallel to the mounting direction I in the automatic fastening device 9. By means of a linear drive 52 the magazines 50 in each case may be arranged in a position parallel to the mounting direction I. For removing a bonding element 3 from the magazine 50, the magazine 50 is displaced into a loading position, as shown in FIG. 8. Relative to the main axis of the automatic fastening device 9, the magazines 50 are arranged in their loading position, displaced outwardly to the side. In a resting position, the magazine 50 is arranged at the side adjacent to the fastening device 9 (not shown). This resting position is also used when bonding the bonding element 3. As a result, when fastening a bonding element 3 to the surface F the automatic fastening device 9 has a smaller interfering contour than when removing a bonding element 3 in the loading position of the magazine 50.

Whilst the magazines 50 according to FIG. 8 are merely movable in a linear manner, it is also preferred in this case to carry out a pivoting movement $S_M$ (See arrows $S_M$ in FIG. 8). By means of this pivoting movement $S_M$, and preferably combined with a linear movement, the magazine 50 may be moved in front of the holder 10 so that a bonding element 3 may be removed from the magazine 50.

If the automatic fastening device 9 is provided with at least one full magazine 50, a linear and/or a pivoting movement $S_H$ may be carried out by the holder 10 and/or a linear and/or a pivoting movement may be carried out by the magazine 50, so that the holder 10 may be automatically loaded with individual bonding elements 3. According to a preferred embodiment of the automatic fastening device 9, for loading the holder 10 initially the magazine 50 is displaced laterally outwards into the loading position (Step S4). Subsequently, the holder 10 is pivoted along the arrow $S_H$ into the removal position at right angles to the mounting direction I (Step S5). In the removal position, the holder 10 is arranged opposite the holding position H of the magazine 50. For removing a bonding element 30 from the holding position H of the magazine 50, the arms 14 grip the bonding element 3 at the holding position H. By a movement of the holder 10 or of the magazine 50 perpendicular to the mounting direction I, the bonding element 3 is released from being clamped by the two holding jaws 54 in the holding position H (Step S6). Subsequently the holder 10 is pivoted back in the mounting direction I, in order to fasten the bonding element 3. Then the magazine 50 is moved back into its resting position, in order to reduce the interfering contour of the automatic fastening device 9 (Step S4).

Within the magazine 50, the plurality of bonding elements 3 are spring-pretensioned towards the holding position H. The spring pretensioning produces a slide 56. If a bonding element 3 is moved out of the holding position H, the slide 56 automatically inserts a new bonding element 3 into the holding position H. As the slide 56 is driven by a spring, the magazine 50 operates independently of an external power source. In this manner, the interfering contour of the automatic fastening device 9 is also reduced as, for example, power cables are saved.

If a new bonding element 3 is displaced by the slide 56 into the holding position H, the movement of the bonding element 3 is stopped by the holding jaws 54 (see FIG. 11). From the holding position H, the bonding element 3 may be released by a movement in, or perpendicular to, the mounting direction I.

In order to position the bonding element 3 located in the holder 10 onto the surface F (Step S7), the automatic fastening device 9 is arranged in front of the desired position, for example by means of the robot. The mounting (S7) takes place either by a movement of the robot or by a straight movement of the holder 10 in the mounting direction I. Subsequently, the light source is activated (Step S8), so that light may reach the bonding point via the fibre-optic conductor 40 and the adhesive may be cured.

In order to avoid stoppage times, during continuous bonding processes new bonding elements 3 are prepared by means of a dispenser 60. The dispenser 60 is shown schematically in FIGS. 12 and 13. To this end, bonding elements 3 are moved beneath a metering device 62 in a targeted manner, in order to provide them with adhesive (Step S1). The prepared bonding elements 3 are then stored in a temporary store 70 in rails 72 provided therefor (see FIG. 13). Preferably, the rails 72 have in each case the ability to grip the bonding elements 3 of a magazine 50.

While the automatic fastening device 9 operates, the bonding elements 3 which are temporarily stored and provided with adhesive are transferred into a magazine 50. Whilst the plurality of bonding elements 3 are forced into the magazine 50, the slide 56 is again pretensioned in order to fulfil its above function. In order to store the bonding elements 3 protected from light in the magazine 50, the heads of the bonding elements 3 provided with adhesive are held under adjacent cover plates 58. The cover plates 58 prevent the incidence of light and thus the curing of the adhesive.

In order to ensure correct operation of the automatic fastening device 9, preferably a selection of the following parameters are monitored. In order to check the quantity of adhesive applied by means of the dispenser 60, 62, the pressure in the dispenser 60, 62 is monitored. The pressure provides information about the quantity of adhesive which has been dispensed with a specific nozzle opening and at a specific pressure.

Moreover, the positioning of the bonding element 3 on the surface F is monitored. To this end, the contact pressure of the bonding element 3 on the surface F is measured. Only when the contact pressure reaches a specific threshold value is the exposure of the bonding point to light initiated. Moreover, the contact pressures are detected and stored.

Additionally, the light intensity applied to the bonding point is preferably monitored. To this end, by means of suitable devices the intensity of the light source in the desired wavelength range is verified between the individual exposure cycles. To this end, exposure to light would have to be provided between a predetermined number of bonding processes for monitoring the intensity. Moreover, a preferred embodiment exists to carry out an on-line monitoring of the light intensity by means of spectroscopy. Thus the light is removed at a specific distance from the light emergence surface via a fibre-optic conductor, and conducted into the spectrometer. By corresponding software, it is also conceivable to calculate and document the light energy introduced over the exposure period.

A further alternative of the automatic fastening device 9 is shown in FIGS. 15 to 17. In this embodiment the holder 10 is connected to a linear drive 12 in the mounting direction I of the bonding element 3. This linear drive 12 serves for mounting the bonding element 3 onto the surface F where it is intended to be fastened by means of light-curing adhesive. It is also preferred, instead of the linear drive 12 or in addition to said linear drive, to fasten the fastening device to a robot (not shown). By means of the robot any spatial movements may be carried out in order to position and subsequently fasten the bonding element 3 at a fastening point to the surface F.

The bonding element 3 is supplied via a supply channel 80. This is carried out, for example, by means of compressed air or other options for transporting individual bonding elements 3. As soon as the bonding element 3 has been supplied, it is taken by the holder 10 and held releasably thereby.

The holder 10 is provided with a joint, so that it may pivot the bonding element 3 towards the dispenser 62. After the application of adhesive 5 onto the pivoted bonding element 3, the holder 10 is pivoted back in the mounting direction. Alternatively, at this point it is also preferred that the adhesive 5 is applied at the fastening point to the surface F onto which the bonding element 3 is to be fastened. The adhesive 5 is applied to the bonding element 3 and/or the fastening point on the surface F based on a linear and/or pivoting movement of the holder 10 and/or a linear and/or pivoting movement of the adhesive dispenser 62.

As soon as the holder 10 together with the bonding element 3 is oriented again parallel to the mounting direction I or the plate-shaped portion of the bonding element 3 is aligned parallel to the surface F, the bonding element 3 is mounted on the surface F. To this end, the linear drive of the holder 10 and/or the robot moves in the mounting direction I until the bonding element 3 is sufficiently pressed or pressed with a defined contact pressure against the surface F. Subsequently, the mounted bonding element 3 is irradiated with light 45 so that an adhesive 5 located on the bonding element 3 and/or the surface F fastens the bonding element 3 to the surface F. As the bonding element 3 preferably consists of transparent material, the light 45 penetrates through the bonding element 3 and cures the adhesive 5. The bonding element 3 consists of the same material and the same curing times are achieved as have been discussed above in connection with a further embodiment of this invention.

Finally, the bonding element 3 is then pressed with a defined contact pressure onto the surface F and fastened by means of light 45.

As discussed, there is provided a manual fastening device (1) for a bonding element (3), in particular a T-shaped mounting element, which comprises the following features:

a. a holder (10) arranged in a housing (20) which is movable in a linear manner in a first direction of movement (I), to which the bonding element (3) may be releasably fastened, b. a light source (40), by which light (45) of a defined wavelength may be radiated in the first direction of movement (I), and c. a positioning device (30) arranged movably relative to the housing (20), by which the fastening device (1) may be positioned correctly relative to a surface (F), in order to apply the bonding element (3).

In the fastening device (1), the positioning device (30) can provide radial light protection relative to the light source (40) in order to avoid lateral emergence of light.

In the fastening device (1), the positioning device (30) may be moved into an installation position in which the bonding element (3) may be installed in the holder and may be moved into a preparation position in which the positioning device (30) is prepared for mounting onto the surface (F).

In the fastening device (1), the positioning device (30) may be moved into a mounting position between the installation and preparation position, so that when reaching the mounting position, a desired positioning of the fastening device relative to the surface may be signalled by an information means.

In the fastening device (1), the positioning device (30) has a plurality of sensors on a front side facing the surface (F) which detect when a desired positioning of the fastening device (1) has been reached relative to the surface (F).

In the fastening device (1), the positioning device (30) can be arranged in a displaceable manner, parallel to the first direction of movement (I), so that a defined spacing may be set between the surface (F) and the bonding element (3) in the holder (10).

According to another aspect, a manual fastening method for a bonding element (3), in particular of a T-shaped mounting element, comprises the following steps:
  a. releasably receiving (B) the bonding element (3) in a holder (10) of a fastening device (1),
  b. positioning (D) the bonding element (3) over a surface (F) by a positioning device (30) of the fastening device (1) being brought into a mounting position based on interaction with the surface,
  c. mounting (4) the bonding element (3) on the surface (F), and
  d. securing (I) the bonding element (3) to the surface (F) as a result of light radiation.

The fastening method can comprise the further step of moving (A) the positioning device (30) between an installation position, in which the bonding element may be installed in the holder, and a preparation position (C), in which the positioning device (30) is prepared for mounting onto the surface (F).

The fastening method can comprise the further step of signalling (F), in particular by light, as soon as the positioning device (30) is in the mounting position.

The fastening method can comprise the further step of shielding the light source (40) by the positioning device (30) and moving (D) the positioning device (30) parallel to a mounting direction (I) of the bonding element (3) towards the surfaces (F) in order to detect € and signal (F) when the mounting position is reached.

In the fastening method and when the mounting position is reached, a signal is produced (G), preferably a light signal or audio signal, which signals when the mounting position is reached.

The fastening method can comprise the further step of applying adhesive, in particular light-curing adhesive onto the bonding element (3) before or after receiving the bonding element (3) in the holder (10).

According to another aspect, an automatic fastening device (9) of a bonding element (3), in particular a T-shaped mounting element, comprises the following features:
  a. a holder (10) to which the bonding element (3) may be releasably fastened, and at least one magazine (50) in which a plurality of bonding elements (3) are removably stored,
  b. a light source (40) by which the bonding element (3) fastened in the holder (10) may be irradiated in a targeted manner,
  c. the holder (10) and the at least one magazine (50) being arranged so that a linear and/or a pivoting movement may be carried out by the holder (10) and/or a linear and/or a pivoting movement may be carried out by the magazine (50), so that the holder (10) may be loaded automatically with individual bonding elements (3).

In the fastening device (9), which in a loading position of the holder (10) and the magazine (50) for loading a bonding element (3) into the holder (10) has a larger interfering contour than in a mounting position for mounting the bonding element onto a surface (F).

The fastening device (9), in which the at least one magazine (50) is arranged parallel to a mounting direction (I) of the fastening device (9) for the bonding elements (3) and a pivoting movement may be carried out by the holder (H), which moves the holder into a loading position adjacent to the magazine (50) and back.

The fastening device (9), in which the magazine (50) is arranged to be movable in a linear manner perpendicular to the mounting direction (I) in order to move the magazine (50) into the loading position and into a resting position.

The fastening device (9), in which in the at least one magazine (50) a plurality of bonding elements (3) may be stored which, due to spring-pretensioning acting in the magazine (50), a holding position (H) of the magazine (50) may be automatically supplied.

The fastening device (9) can further comprise a dispenser (70) with which the bonding element (3) may be provided with light (40) curing adhesive (5), before the bonding element (3) is received in the at least one magazine (50) or before the bonding element (3) is mounted onto the surface (F) by the holder (10).

The fastening device (9) can be fastened to a robot.

According to another aspect, there is an automatic fastening method for a bonding element (3), in particular of a T-shaped mounting element, which comprises the following steps:
  a. releasably receiving (S6) the bonding element (3) from a magazine (50) in a holder (10) of a fastening device (9) based on a linear and/or pivoting movement of the holder (10) and/or a linear and/or pivoting movement of the magazine (50),
  b. mounting (S7) the bonding element (3) onto a surface (F) and
  c. irradiating (S8) the bonding element (3) with light (45) so that an adhesive (5) located on the bonding element (3) fastens the bonding element (3) to the surface.

The fastening method can comprise the further step of pivoting (S5) the holder (10) from a mounting direction (I) into a removal position perpendicular to the mounting direction (I) adjacent to the magazine (50).

The fastening method can comprise the further step of moving (S4) the magazine (50) arranged parallel to the mounting direction (I), between a resting position and a loading position perpendicular to the mounting direction (I) so that during the mounting of the bonding element (3) the fastening device (9) has a smaller interfering contour than when loading the bonding element (3) in the holders (10).

The fastening method can comprise the further step of automatically providing (S1) a plurality of bonding elements (3) with light-curing adhesive, temporarily storing (S2) the plurality of bonding elements provided with adhesive and/or moving (S3) the plurality of bonding elements provided with adhesive into the at least one magazine.

According to yet another aspect, there is an automatic fastening device of a bonding element (3), in particular a T-shaped mounting element, which comprises the following features:
  a. a holder (10) to which the bonding element (3) may be releasably fastened, and at least one bonding element-supply channel (80) via which a plurality of bonding elements (3) may be individually supplied to the holder (10),
  b. an adhesive dispenser (62) with which adhesive (5) in particular light-curing adhesive may be applied automatically to the bonding element (3) or at a fastening point onto a surface (F) for fastening the bonding element (3), and c. a light source (40) with which the bonding element (3) fastened in the holder (10) and/or the fastening point may be irradiated in a targeted manner.

The fastening device can be fastened to a robot.

In the fastening device, the holder (10) can be arranged pivotably and/or movably in a linear manner parallel to a mounting direction (I) of the bonding element (3).

In the fastening device, the adhesive dispenser (62) can be arranged movably in a linear manner and/or pivotably, in order to be movable towards the bonding point and/or towards the bonding element (3) in the holder (10).

According to yet another aspect, there is an automatic fastening method for a bonding element (3), in particular a T-shaped mounting element, which comprises the following steps:

a. automatically supplying individual bonding elements (3) via a supply channel (80) to a holder (10) of a fastening device, b. releasably receiving the bonding element (3) in the holder (10), c. applying a light-curing adhesive (5) to the bonding element (3) and/or to a surface (F) based on a linear and/or pivoting movement of the holder (10) and/or a linear or pivoting movement of an adhesive dispenser (62), d. mounting the bonding element (3) onto the surface (F) and e. irradiating the bonding element (3) with light (45) so that an adhesive (5) located on the bonding element (3) and/or the surface (F) fastens the bonding element (3) to the surface (F).

These and other variations and modifications will be apparent from the following claims.

The invention claimed is:

1. A manual fastening method for a bonding element realized by means of a manual fastening device having a positioning device and a light source wherein the method comprises the following steps:
 a) releasably receiving the bonding element in a holder of the manual fastening device wherein the positioning device is first moved in an installation position releasing the holder,
 b) positioning the bonding element over a surface by the positioning device of the manual fastening device being displaced into a preparation position in which the positioning device radially surrounds the holder and the bonding element fastened thereto, and positioning the positioning device onto the surface so that the bonding element is brought into a mounting position based on interaction with the surface,
 c) mounting the bonding element on the surface, and
 d) securing the bonding element to the surface as a result of light radiation, wherein a light source radiates light in a mounting direction of the bonding element while the positioning device acts as lateral light protection and prevents a radial emergence of light.

2. The fastening method according to claim 1, further comprising the step of:
 moving the positioning device between the installation position, in which the bonding element may be installed in the holder, and the preparation position, in which the positioning device is prepared for mounting onto the surface.

3. The fastening method according to claim 1, further comprising the step of:
 signaling by means of a signal as soon as the positioning device is in the mounting position.

4. The fastening method according to claim 3, in which the signal is one of a light signal or an audio signal.

5. The fastening method according to claim 1, further comprising the step of:
 shielding the light source by the positioning device and moving the positioning device parallel to a mounting direction of the bonding element towards the surfaces in order to detect and signal when the mounting position is reached.

6. The fastening method according to claim 5, in which when the mounting position is reached a signal is produced, which signals when the mounting position is reached.

7. The fastening method according to claim 1, further comprising the step of:
 applying an adhesive onto the bonding element before or after receiving the bonding element in the holder.

8. The fastening method according to claim 7, in which the adhesive is a light curing adhesive.

9. A manual fastening method for a bonding element realized by means of a manual fastening device having a positioning device and a light source wherein the method comprises the following steps:
 a) releasably receiving the bonding element in a holder of the manual fastening device wherein the positioning device is first moved in an installation position releasing the holder,
 b) positioning the bonding element over a surface by the positioning device of the manual fastening device being displaced into a preparation position in which the positioning device radially surrounds the holder and the bonding element fastened thereto, and positioning the positioning device onto the surface so that the bonding element is brought into a mounting position based on interaction with the surface, wherein sensors disposed on the positioning device surface are configured to detect when a desired positioning of the fastening device relative to the surface has been reached and, upon determining the desired positioning is reached communicating to a user the reaching of the desired positioning,
 c) mounting the bonding element on the surface, and
 d) securing the bonding element to the surface as a result of light radiation.

10. The fastening method according to claim 9, further comprising the step of:
 moving the positioning device between the installation position, in which the bonding element may be installed in the holder, and the preparation position, in which the positioning device is prepared for mounting onto the surface.

11. The fastening method according to claim 9, further comprising the step of:
 signaling by means of a signal as soon as the positioning device is in the mounting position.

12. The fastening method according to claim 11, in which the signal is one of a light signal or an audio signal.

13. The fastening method according to claim 9, further comprising the step of:
 shielding the light source by the positioning device and moving the positioning device parallel to a mounting direction of the bonding element towards the surfaces in order to detect and signal when the mounting position is reached.

14. The fastening method according to claim 9, further comprising the step of:
 applying an adhesive onto the bonding element before or after receiving the bonding element in the holder.

15. The fastening method according to claim 14, in which the adhesive is a light curing adhesive.

16. An automatic fastening method for a bonding element, by means of an automatic fastening device having a linearly movable or pivotable holder for loading the bonding element from at least one magazine on the fastening device, wherein the method which comprises the following steps:
 a) automatically providing a plurality of said bonding elements with light-curing adhesive, and moving the plurality of said bonding elements provided with the adhesive into the at least one magazine,
 b) releasably receiving the bonding element from a magazine in a holder of the automatic fastening device based on at least one of a linear or pivoting movement of the holder or a linear or pivoting movement of the magazine movably mounted to the automatic fastening device,
 c) mounting the bonding element onto a surface, and
 d) irradiating the bonding element with light by means of a plurality of LEDs in order to cure adhesive by exposure to light when a desired positioning of the fastening device relative to the surface has been reached and, upon determining the desired positioning is reached, adapted to communicate to the holder to mount the bonding element to the surface and communicate to the light source to radiate light so that the adhesive located on the bonding element fastens the bonding element to the surface.

17. The fastening method according to claim 16, further comprising the step of:
 pivoting the holder from a mounting direction into a removal position perpendicular to the mounting direction adjacent to the magazine.

18. The fastening method according to claim 16, further comprising the step of:
 moving the magazine arranged parallel to the mounting direction, between a resting position and a loading position perpendicular to the mounting direction so that during the mounting of the bonding element the fastening device has a smaller interfering contour than when loading the bonding element in the holder.

19. An automatic fastening method for a bonding element by means of an automatic fastening device having a linearly movable or pivotable holder for loading the bonding element from at least one magazine on the fastening device wherein the method which comprises the following steps:
 a) automatically providing a plurality of said bonding elements with light-curing adhesive, and moving the plurality of said bonding elements provided with the adhesive into the at least one magazine,
 b) releasably receiving the bonding element from a magazine in a holder of the automatic fastening device based on at least one of a linear or pivoting movement of the holder or a linear or pivoting movement of the magazine movably mounted to the automatic fastening device,
 c) mounting the bonding element onto a surface,
 d) measuring a contact pressure of the bonding element on a surface while positioning so that a plurality of LEDs are activated when the contact pressure reaches a specific threshold value, and
 e) irradiating the bonding element with light so that the adhesive located on the bonding element fastens the bonding element to the surface.

20. The fastening method according to claim 19, further comprising the step of:
 pivoting the holder from a mounting direction into a removal position perpendicular to the mounting direction adjacent to the magazine.

21. The fastening method according to claim 19, further comprising the step of:
 moving the magazine arranged parallel to the mounting direction, between a resting position and a loading position perpendicular to the mounting direction so that during the mounting of the bonding element the fastening device has a smaller interfering contour than when loading the bonding element in the holder.

22. An automatic fastening method for a bonding element, which comprises the following steps:
 a) automatically supplying individual bonding elements via a supply channel to a holder of a fastening device,
 b) releasably receiving an individual bonding element in the holder, wherein the holder is adapted to releasably grip the bonding element,
 c) applying a light-curing adhesive to at least one of the bonding element or to a surface based on a linear and/or pivoting movement of the holder or a linear or pivoting movement of an adhesive dispenser,
 d) positioning the bonding element by means of a positioning device onto the surface, the positioning device having a positioning device surface facing the surface,
 e) mounting the bonding element onto the surface, and
 f) irradiating the bonding element with light so that the adhesive located on at least one of the bonding element or surface fastens the bonding element to the surface wherein sensors are disposed on the positioning device surface for detecting when a desired positioning of the fastening device relative to the surface has been reached.

23. The fastening method according to claim 22, in which the bonding element is a T-shaped mounting element.

\* \* \* \* \*